Patented Aug. 4, 1942

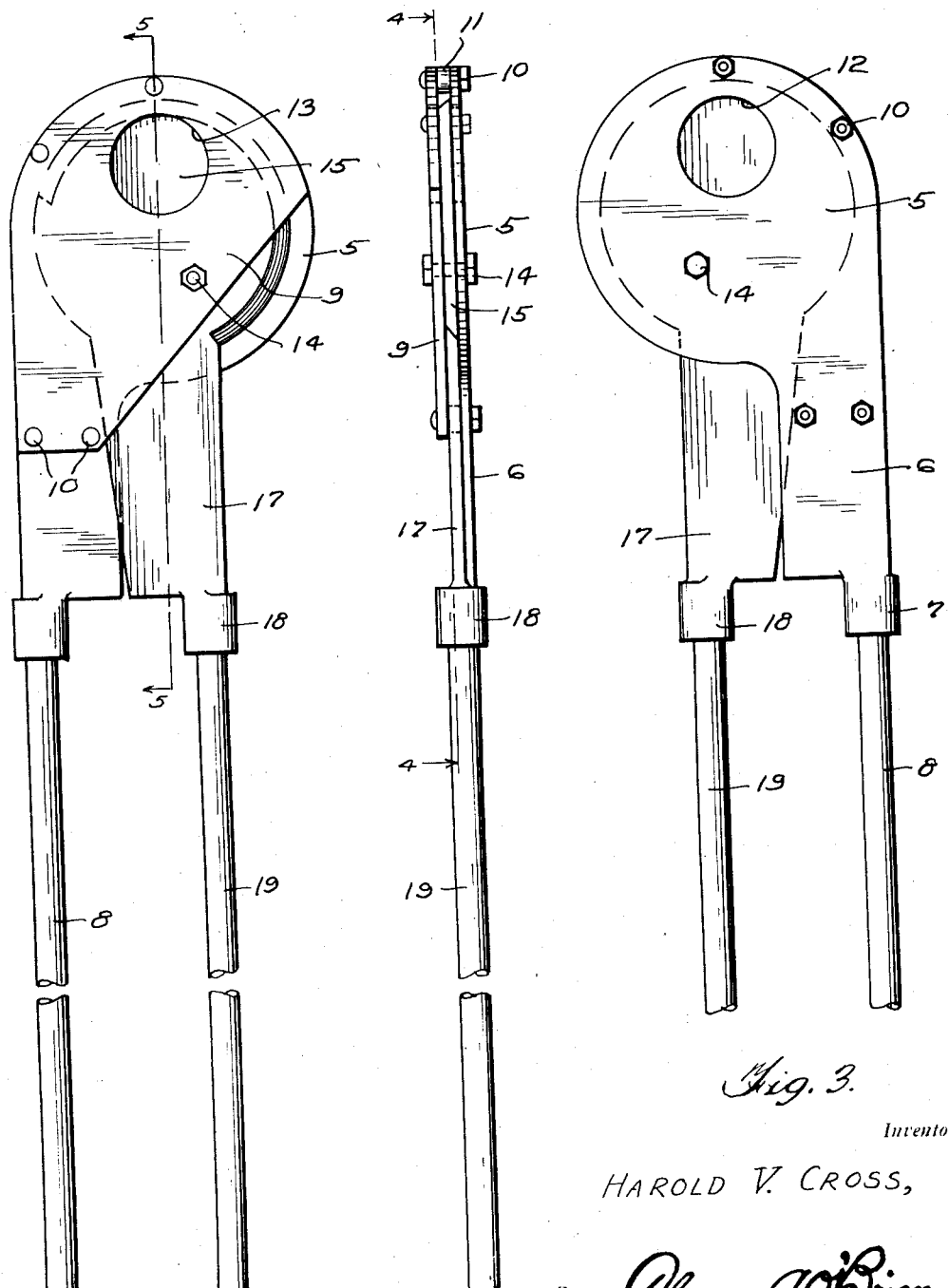

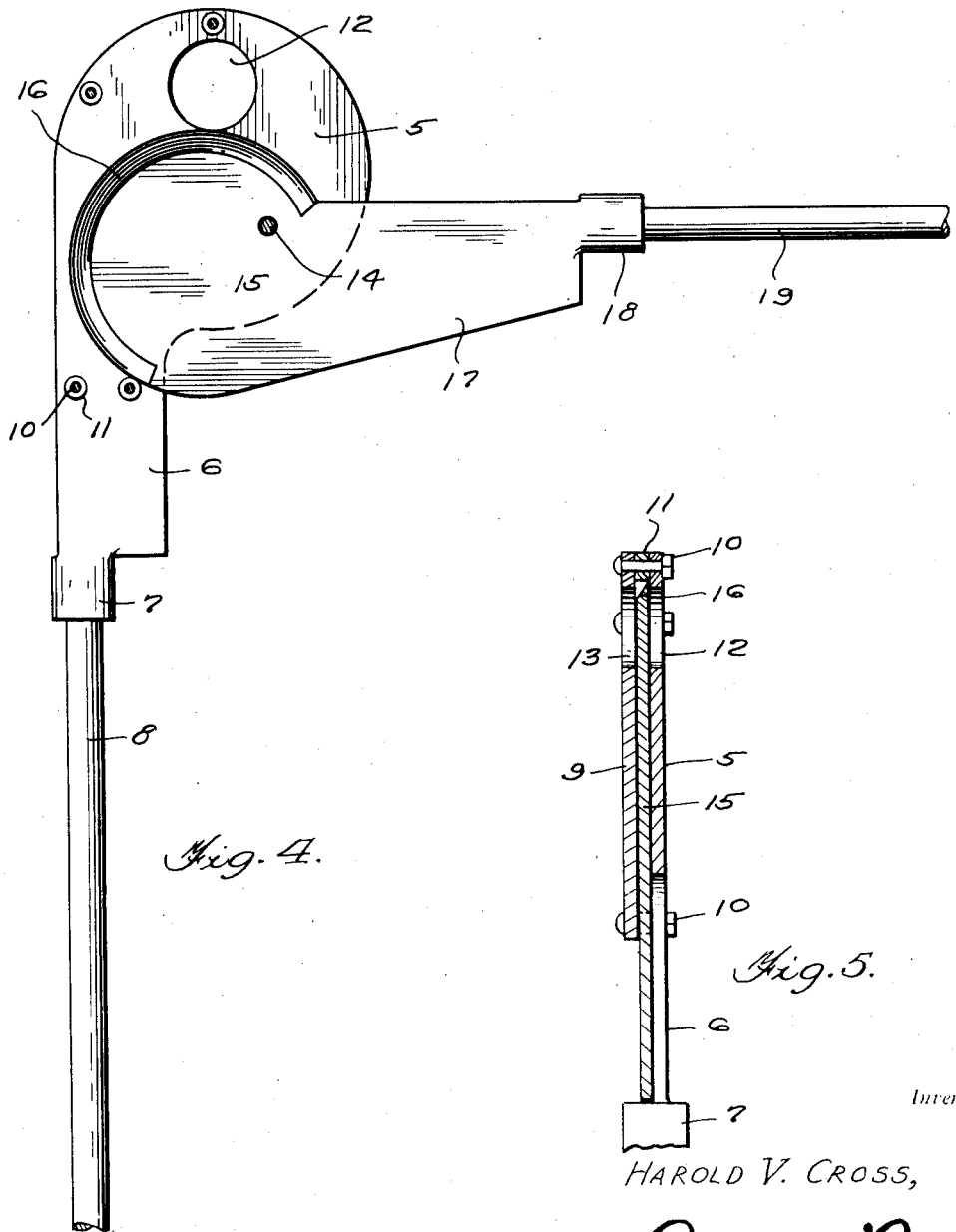

2,292,204

UNITED STATES PATENT OFFICE 2,292,204

CATTLE DEHORNER

Harold V. Cross, Miles City, Mont.

Application February 9, 1942, Serial No. 430,138

1 Claim. (Cl. 30—258)

The present invention relates to new and useful improvements in cattle dehorners and has for its primary object to provide a pivoted cutting tool adapted to easily and quickly sever the horn close to the head without danger of crushing the horn and in a manner to reduce pain to the animal.

A further object is to provide a device of this character of simple and practical construction, which is strong and durable, efficient and reliable in use, and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1 is a side elevational view of the cutter.

Figure 2 is an edge elevational view.

Figure 3 is a side elevational view opposite to Figure 1.

Figure 4 is a sectional view taken substantially on a line 4—4 of Figure 2, and

Figure 5 is a sectional view taken substantially on a line 5—5 of Figure 1.

Referring now to the drawings in detail wherein for the purpose of illustration I have disclosed a preferred form of my invention, the numeral 5 designates a flat head of disk shape projecting laterally from one edge of a flat shank 6 at the outer end thereof. A socket 7 is formed at the inner end of the shank in which is secured a handle 8.

A plate 9 is secured to the head by bolts 10 and spaced therefrom by spacing sleeves 11 mounted on the bolts. Aligned openings 12 and 13 are formed in the head and plate, respectively, eccentrically with respect to the center of the head.

A pivot pin 14 is inserted through the head and plate, also eccentrically thereof, and longitudinally inwardly of the openings. Positioned between the head 5 and plate 9 is a flat blade 15 of disk form and pivotally mounted on the pin 14 eccentrically of the axis of the blade. The edge of the blade is beveled as shown at 16 and is formed on the outer end of a flat shank 17 also having a socket 18 formed at its inner end for receiving a handle 19.

When the handles 8 and 19 are moved away from each other, as shown in Figure 4, the blade 15 uncovers the openings 12 and 13 so that the horn of the animal may be inserted in the openings and by moving the handles toward each other, the edge of the blade wipes across the openings to cut the horn.

By positioning the blade between the head and plate, the horn is supported in the openings at opposite sides of the blade and the eccentric mounting of the blade produces a rotary motion for the blade as it penetrates through the horn thus causing a clean cut without danger of crushing the horn.

It is believed the details of construction and manner of use of the device will be readily understood from the foregoing without further detailed explanation.

Having thus described the invention what I claim is:

A cattle dehorner comprising a flat disk-like head, a flat shank projecting from one edge of the head and having a socket formed at its outer end, a handle secured in the socket, a plate secured to one side of the head in spaced relation therefrom, said head and plate having aligned openings adjacent one edge adapted to receive the horn of an animal, a blade positioned between the head and the plate and pivoted eccentrically thereto, said blade having a curved cutting edge adapted to move across the openings to sever the horn, a flat shank projecting from one edge of the blade and having a socket formed at its outer end, and a second handle secured in said last-named socket.

HAROLD V. CROSS.